Patented Feb. 18, 1941

2,232,421

UNITED STATES PATENT OFFICE 2,232,421

LUBRICANT

Arnold R. Workman, Malverne, N. Y., assignor to Cities Service Oil Company, New York, N. Y., a corporation of Pennsylvania No Drawing. Application September 21, 1939, Serial No. 295,907

10 Claims. (Cl. 252—32)

This invention relates to improved lubricant and method of manufacture. More particularly the invention relates to improvements in lubricating greases containing rubber or elastic hydrocarbon derivatives.

Various proposals have been made for the use of rubber in greases as shown for example at page 615 of "Lubricating Greases: Their Manufacture and Use," by Klemgard, 1937. As far as known, however, greases containing rubber have not been made or used to any appreciable extent.

The primary object of the present invention is to provide a grease composition containing an elastic hydrocarbon such as rubber which will be suitable for present commercial and industrial uses.

A further object of the invention is to improve the manufacture of lubricants and particularly greases containing elastic hydrocarbon such as rubber, and provide a lubricant in which a relatively small proportion of elastic hydrocarbon can be made effective in the preparation of an adherent lubricant.

In general, the improved lubricants are prepared in accordance with the present invention by plasticizing a given quantity of rubber with a neutral ester of a phosphorus acid, such for example, as tri-butyl phosphite, or a phosphine. This may be accomplished by mixing one part of rubber hydrocarbon with approximately an equal quantity of tri-butyl phosphite at a temperature of approximately 100° C. The plasticizing operation may be accomplished by a combination of heating, digestion and mixing. This base product is then added to a lubricating oil, which is also preferably heated to a temperature of approximately 100° C., in sufficient proportion to give a final product containing about 0.5% of rubber hydrocarbons. Where the base product is used in greases, a grease of any desired characteristics is preferably first prepared, and while it is maintained at a temperature of about 100° C. or slightly higher, the hot plasticized rubber product is added and thoroughly incorporated in the grease mixture.

Various types of rubber or elastic hydrocarbons may be used in preparing lubricants in accordance with the present invention. For example, rubber latex, Indian caoutchouc, para caoutchouc, gutta percha, gum rubber, balata, chlorinated rubber and artificially synthesized rubber compounds.

A gear grease suitable for use in automobiles may be made by first making a lime grease from tallow, hydrated lime, caustic soda, red oil and a lubricating distillate in the usual manner. Such a grease having an S. A. E. number of about 90 will comprise about 65% by weight of a lubricating distillate of about 157 S. A. E. viscosity at 210° F., about 28% red oil, and the remainder tallow, lime, caustic soda and water. The plasticized rubber product made in the manner described above is added to the grease in sufficient proportion to give a final product containing approximately 0.75% of rubber hydrocarbon.

Where rubber latex (an emulsion of rubber in water) is used for making up the plasticized base product, it is thoroughly agitated with the tributyl phosphite and then allowed to settle for the removal of the water which separates out. The remainder of the mixture which still contains considerable water is heated (not above 100° C.) and intimately agitated with an inert gas to thoroughly dry the mixture.

The grease made in accordance with the present invention may be made with any soap base other than lime, such for example as aluminum stearate, aluminum oleate, as well as with lead and sodium soaps.

Gear oils for extreme pressure purposes may be made by adding about 2% of the plasticized rubber base mixture to a 645 Pa. lubricating stock which has a Saybolt viscosity of about 170 at 210° F. A particularly efficient extreme pressure lubricant may be made from a base comprising chlorinated rubber plasticized with tri-chlorobutyl phosphine or tri-mercaptabutyl phosphine. This plasticized chlorinated rubber base may be mixed with motor oils or heavy lubricating oils for extreme pressure purposes or with greases. In plasticizing chlorinated rubber the halogenated alkyl phosphines or alkyl mercapto derivatives of phosphine are used in preference to the straight alkyl phosphines, because of greater compatability but tri-aryl phosphines are good plasticizing agents for the chlorinated rubber. The aryl phosphines may also be used in plasticizing ordinary rubber or any of the types of elastic hydrocarbons referred to above. Such compounds are tri-phenyl phosphine, tri-cresol phosphine and other phenyl phosphines in which one or more hydrogens of the phenyl group has been substituted by a halogen or sulfur, and/or side chains containing up to six carbon atoms, which also may contain a halogen or sulfur atom.

In plasticizing the rubber and elastic hydrocarbons as well as chlorinated or brominated rubber, temperatures above about 100° C. should be avoided in order to avoid any thermal decomposition of the rubber compounds. While pentavalent phosphorous esters may be used in some instances, the trivalent (phosphine) organic phosphorus compounds are preferred.

The organic phosphine derivatives used for plasticizing the rubber in accordance with the present invention, and included in the lubricant eventually prepared, not only serve to maintain the rubber molecules in a plastic usable condition as a lubricant, but also appear to advantageously affect the molecular section of the rubber on the wearing surfaces of bearings being lubricated. There may be a reaction, condensation or some unusual attraction between the phosphine and elastic hydrocarbon molecules. The organic phosphines also act to protect the rubber molecule from the effects of air and other incidental oxidizing or active media with which the lubricant may come in contact. Chlorinated rubber is much less susceptible to external influence and oxidizing conditions than is ordinary rubber. Chlorinated rubber has unusual chemical resistance and stability, and therefore may be used under heavy duty conditions where it will greatly aid in maintaining an adherent lubricating film on the bearings being lubricated.

Lubricants prepared in accordance with the present invention may contain from 0.3 to 4.5% of rubber or elastic hydrocarbon, depending on the individual rubber used and the use for which the lubricant is made. The elastic hydrocarbons may be plasticized or reacted with from one half to twice their quantity of the organic phosphine compound to produce the product to be incorporated into various types of lubricants. The harder the elastic hydrocarbon or rubber, the greater the proportion of organic prosphine used.

While the features of the invention have been described in substantial detail, it is to be understood that the application of the process and compositions of the present invention are not restricted to the specific examples given above, but are to be restricted only within the scope of the appended claims.

Having thus described the invention in its preferred form, what is claimed as new is:

1. The method of preparing an adherent lubricating composition, which comprises composing a lubricating grease containing a metallic soap and a relatively heavy lubricating oil, plasticizing rubber at a temperature of approximately 100° C. with an organic phosphine compound and mixing the resulting plasticized rubber with the grease composition at a temperature of approximately 100° C. to thoroughly incorporate the plasticized rubber into the grease.

2. The method of preparing an adherent lubricating composition, which comprises making a lubricating grease containing a metallic soap and a relatively heavy lubricating oil, plasticizing an organic elastic compound at a temperature not in excess of 100° C. with an organic ester of a phosphorus acid, and mixing the resulting plasticized product with the grease composition at a temperature of approximately 100° C. to thoroughly incorporate the plasticized product into the grease, said organic elastic compound being selected from the group consisting of rubber, rubber latex, gum rubber, halogenated rubber, synthesized rubber compounds, Indian caoutchouc, para caoutchouc, gutta percha and balata.

3. The method of preparing an adherent lubricating composition, which comprises reacting an organic elastic compound with approximately an equal proportion of an ester of a phosphorus acid to produce a homogeneous product, and mixing a relatively small proportion of the product with a lubricant to prepare the lubricating composition, said organic elastic compound being selected from the group consisting of rubber, rubber latex, gum rubber, halogenated rubber, synthesized rubber compounds, Indian caoutchouc, para caoutchouc, gutta percha and balata.

4. The method of preparing an adherent lubricating composition, which comprises reacting an organic elastic compound with a substantial proportion of an organic phosphine to produce a homogeneous plastic product, and incorporating said product in relatively small proportions in a lubricating medium to produce said adherent lubricating composition, said organic elastic compound being selected from the group consisting of rubber, rubber latex, gum rubber, halogenated rubber, synthesized rubber compounds, Indian caoutchouc, para caoutchouc, gutta percha and balata.

5. A lubricant comprising a hydrocarbon oil and a relatively small proportion of a plastic material including a homogeneous body composed of plasticizing proportions of an organic phosphine and an organic elastic compound selected from the group consisting of rubber, rubber latex, gum rubber, halogenated rubber, synthesized rubber compounds, Indian caoutchouc, para caoutchouc, gutta percha and balata.

6. A lubricant comprising a hydrocarbon oil and a relatively small proportion of a product made by plasticizing rubber with an organic phosphine.

7. A lubricant comprising a hydrocarbon oil and a relatively small proportion of a product made by plasticizing a halogenated rubber with an organic phosphine.

8. A lubricant comprising a hydrocarbon oil and a relatively small proportion of a product made by plasticizing an organic elastic compound with an organic phosphine in which the organic groups of the phosphine contain a halogen atom and in which the organic elastic compound used in making said product is selected from the group consisting of rubber, rubber latex, gum rubber, halogenated rubber, synthesized rubber compounds, Indian caoutchouc, para caoutchouc, gutta percha and balata.

9. A lubricant comprising a hydrocarbon oil and a relatively small proportion of a product made by reacting an organic elastic compound with an organic phosphine in which the organic groups of the phosphine contain a sulfur atom and in which the organic elastic compound used in making said product is selected from the group consisting of rubber, rubber latex, gum rubber, halogenated rubber, synthesized rubber compounds, Indian caoutchouc, para caoutchouc, gutta percha and balata.

10. A lubricant comprising a hydrocarbon oil and a homogeneous product made by plasticizing an organic elastic compound with an organic phosphine in which the organic elastic compound used in making said product is selected from the group consisting of rubber, rubber latex, gum rubber, halogenated rubber, synthesized rubber compounds, Indian caoutchouc, para caoutchouc, gutta percha and balata, said lubricant containing approximately 0.5% of the organic elastic compound.

ARNOLD R. WORKMAN.